United States Patent [19]

Nemeth

[11] Patent Number: 4,979,797
[45] Date of Patent: Dec. 25, 1990

[54] MULTI-LEVEL FIBER-OPTIC LIQUID-LEVEL SENSING SYSTEM

[75] Inventor: Frank A. Nemeth, Harwinton, Conn.

[73] Assignee: Imo Industries, Inc., Princeton, N.J.

[21] Appl. No.: 418,157

[22] Filed: Oct. 6, 1989

[51] Int. Cl.$^5$ .................. G02B 6/02; G01N 21/26
[52] U.S. Cl. .................. 350/96.29; 350/96.15; 350/96.1; 250/577
[58] Field of Search ............... 350/96.29, 96.18, 96.19, 350/96.26, 96.15; 250/577, 227; 73/293

[56] References Cited

U.S. PATENT DOCUMENTS

| | | | |
|---|---|---|---|
| 4,155,013 | 5/1979 | Spiteri | 250/557 |
| 4,156,149 | 5/1979 | Vaccari | 250/557 |
| 4,329,017 | 5/1982 | Kapany et al. | 350/96.19 |
| 4,707,064 | 11/1987 | Dobrowoski et al. | 350/96.19 |
| 4,713,552 | 12/1987 | Denis et al. | 250/557 |

FOREIGN PATENT DOCUMENTS 3247192 7/1984 Fed. Rep. of Germany ...... 250/557

*Primary Examiner*—John D. Lee
*Assistant Examiner*—John Ngo
*Attorney, Agent, or Firm*—Hopgood, Calimafde, Kalil, Blaustein & Judlowe

[57] ABSTRACT

Plural sensor prisms and associated opticalfiber circuits are arrayed as a single vertical stem by which the individual prisms serve for response to each of a plurality of different liquid levels. Each prism is formed of light-transmitting plastic material which can be injection-molded to precision dimensions. The body configuration is such as to adapt to arrayed interconnection with tubular members, also of plastic, and bonded at telescoping fit of each prism to the tubular member or members to which it is connected. The prism configuration relied upon for sensed response to the presence of immersing liquid (as compared to air) is a solid region having an exterior profile which includes a downwardly convergent conical surface portion at least at spaced locales which are at equal but opposite offset from the cylindrical body axis, wherein the geometric apex angle of downward convergence is 90 degrees. As long as a given prism is exposed to air, a large amount of light is transmitted (by reflection within the prism) from a transmission optical fiber to a receiving optical fiber. But when immersed in a liquid, a portion of the light from the transmitting fiber is refracted into the liquid, resulting in a clearly detectable decrease in the amount of light coupled to the receiving fiber.

10 Claims, 2 Drawing Sheets

MULTI-LEVEL FIBER-OPTIC LIQUID-LEVEL SENSING SYSTEM

BACKGROUND OF THE INVENTION

The invention relates to systems in which circuits employing optical fibers and prism sensors are used in detection of a plurality of different liquid levels.

Current multi-level fiber-optic sensing systems employ a separate distinct probe for each level to be detected. For example, separate fiber-optic rods of various lengths can be bundled together in a circular pattern to form a multi-level sensor. As the number of levels to be sensed increases, so does the size of the sensing system.

BRIEF STATEMENT OF THE INVENTION

It is an object of the invention to provide an in-line system of prisms for multi-level sensing, wherein level-sensing prisms are of such standardized inexpensive design as to make possible the ready custom assembly of a single stem of connected sensors, at spacings appropriate to different job specifications, consistent with liquid-level detection at the elevation of each of the different spacings.

Another object is to achieve the above object with all optical circuits accommodated and enclosed within the single assembled stem.

The invention achieves these objects using a cylindrical-body configuration for each prism, with the prisms formed of light-transmitting plastic material which can be injection-molded to precision dimensions. The body configuration is such as to adapt to arrayed interconnection with tubular members, also of plastic, and bonded at telescoping fit of each prism to the tubular member or members to which it is connected. The prism configuration relied upon for sensed response to the presence of immersing liquid (as compared to air) is a solid region having an exterior profile which includes a downwardly convergent conical surface portion at least at spaced locales which are at equal but opposite offset from the cylindrical body axis, wherein the geometric apex angle of downward convergence is 90 degrees. For each liquid level to be sensed, the upper ends of paired optical fibers are externally accessible via the upper end of the stem array, and the lower ends of these fibers are embedded in the body of the involved prism, on diametrically opposed axes which are parallel to the cylindrical body axis of the involved prism; and the geometric downward projection of each of the lower ends has incidence with a different one of the spaced locales of the involved prism. For each pair of optical fibers, one fiber transmits light to the prism, and the other fiber of the pair can receive light that has been reflected via the respective locales. As long as the prism is exposed to air, a large amount of light is transmitted (by reflection within the prism) from the transmission fiber to the receiving fiber. But when immersed in a liquid, a portion of the light from the transmitting fiber is refracted into the liquid, resulting in a clearly detectable decrease in the amount of light coupled to the receiving fiber. The amount of decrease is a function of the refractive index of the liquid, compared to that of air.

The advantages of the invention are that material and fabrication costs are very low, since the plastic prism can be injection-molded; probe size is very small, allowing multiple levels to be sensed, by using multiple prisms in in-line array and on the same stem; and reflecting/refracting discrimination is so clear that a light-emitting diode and a photodiode coupled to the respective upper fiber ends of each pair can complete the optical circuit for each liquid level to be sensed along the assembled stem.

DETAILED DESCRIPTION

A preferred embodiment of the invention will be described in detail, in conjunction with the accompanying drawings, in which.

Figure 1:
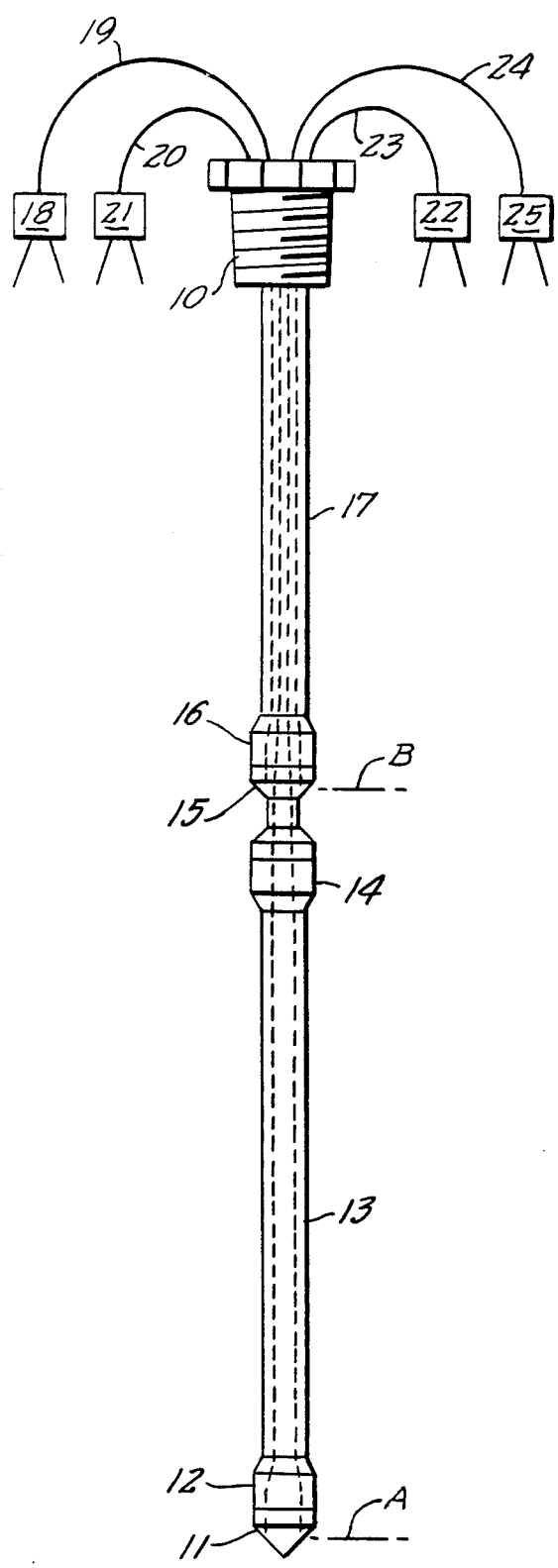
FIG. 1 is a simplified view in elevation of a multi-level fiber-optic liquid-level sensing system.

The system of FIG. 1 is a single-stem array of interfitting modular components adapted for mechanical suspension via an upper plug fitting 10, suitable for attachment at a mounting aperture in the top closure of a tank (not shown) in which liquid level is to be detectable at each of two levels—a lower level A, and an upper level B. Reading upward from the bottom, a lower prism sensor 11 is connected via a tubular adapter 12 to a lower tubular stem component 13, and another tubular adapter 14 connects the stem component 13 to the lower end of an upper prism sensor 15. A further tubular adapter 16 connects sensor 15 to an upper stem component 17, which in turn is suspended from the plug fitting 10.

A first pair of optical fibers extends through the thus-assembled stem to establish a first optical circuit of light transmission from a source, such as a light-emitting diode (LED) 18, via a first optical fiber 19 to the lower prism sensor 11; this circuit is completed, for such light as is internally reflected within prism 11, via a second optical fiber 20 which connects prism 11 to an externally accessible photo detector 21, shown as a photodiode.

In similar fashion, a second pair of optical fibers extends through the upper portion 17 of the assembled stem to establish a second optical circuit of light transmission from a source, such as a light-emitting diode 22, via a first optical fiber 23, to the upper prism sensor 15; this circuit is completed, via a second optical fiber 24, for such light as is internally reflected within prism 15, to an externally accessible photo detector 25, which may also be a photodiode.

Figure 2:
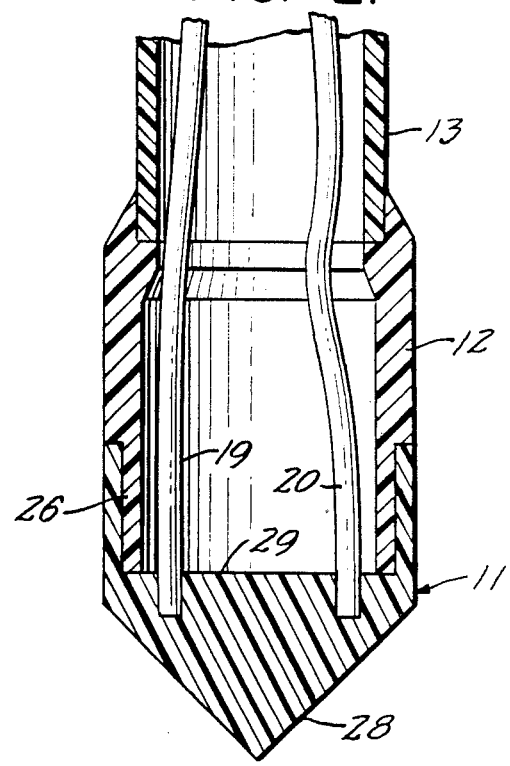
FIG. 2 is a fragmentary view in longitudinal section, to show detail of sensor construction and optical-fiber connection, at the lower level of the system of FIG. 1.

More specifically, for detection response at the lower level A, FIG. 2 shows the reduced end 26 of tubular adapter 12 (FIG. 4) to have telescoping fit to the cylindrical bore at the upper end of prism 11; and the lower end of the lower stem component 13 has a similar fit to the cylindrical bore 27 at the upper end of adapter 12.

Adapter 12 and prism 11 may be of injection-molded plastic, the plastic of prism 11 being light-transmitting, as for example of polymethylmethacrilate; and stem 13 may be a suitable length of extruded plastic tubing. All these, and other telescoping fits of one component to another will be understood to be adhesively and imperviously bonded, to preclude liquid ingress.

Figure 3:
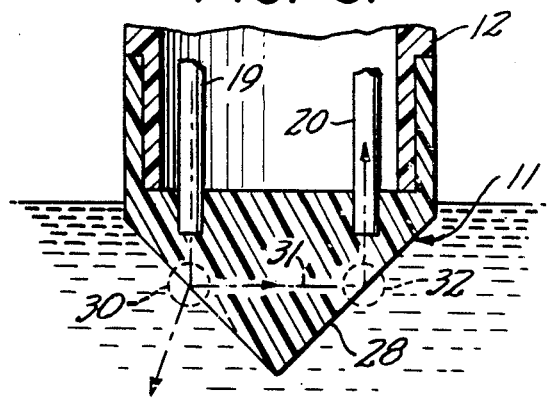
FIG. 3 is a fragmentary view similar to FIG. 2, with sectional cross-hatching de-emphasized; to enable discussion of reflection vs. refraction discrimination, in the involved prism structure.

Prism 11 is generally cylindrical, and its lower end 28 is a downwardly convergent cone, having a 90 degree apex angle. At its upper end, the bore which receives the reduced lower end 26 of adapter 12 terminates in a flat surface 29, and short cylindrical bores, parallel to the central axis of prism 11 and at diametrically opposed offsets therefrom, provide thus-aligned support for the lower end of the respective transmitting (19) and receiving (20) optical fibers. The diagram of FIG. 3 shows that light from LED 18 and exiting from the lower end of optical fiber 19 is directed downward to incidence with a first locale 30 of the conical interface between the material of prism 11 and its environment.

If the environment of prism 11 at the elevation of locale 30 is air (meaning that liquid is at a level insufficient to immerse locale 30), then light thus transmitted by optical fiber 19 will be internally reflected, diametrically across the prism, along the path 31 and into incidence with a second locale 32 of conical prism-to-air interface, for reflection upward in alignment with the axis of the lower end of the light-receiving optical fiber 20, and therefore for detection at photodiode 21. Such reflection occurs by reason of the relatively great difference between refractive indices for air and the transparent plastic of prism 11. If, on the other hand, the environment of prism 11 at the elevation of locale 30 is a liquid (e.g., water, or oil), a very substantial fraction of the light from fiber 19 and incident at locale 30 encounters a prism-to-liquid interface involving more closely related indices of refraction, with the result that this substantial fraction is refracted into the liquid volume; accordingly, internal reflection within the prism is much reduced, and this circumstance is readily noted by reduced photodiode response at 21.

Figure 4:
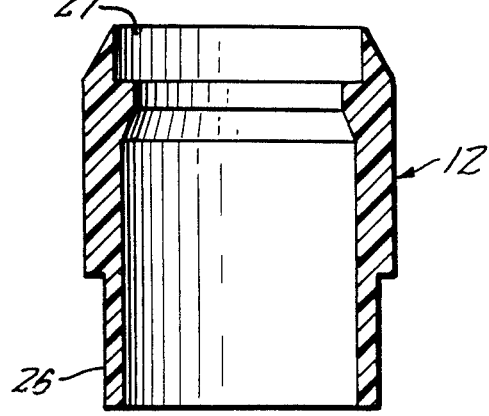
FIG. 4 is a view in longitudinal section, for a stem-adapting component of the system of FIG. 1.
Figure 7:
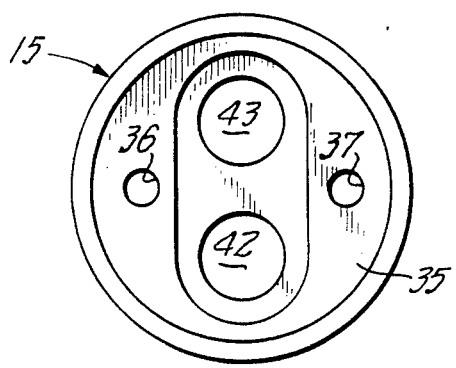
FIG. 7 is a top-end view of the sensor component of FIGS. 5 and 6.

Referring now to FIGS. 5 to 8, the upper-level prism 15 is seen to be generally cylindrical and to feature upper and lower cylindrical ends with bores 33, 34 adapted for telescoping fit to adapters 14, 16, of the nature shown in FIG. 4. As in the case of the lower prism 11, the upper-end bore 33 of prism 15 has a flat bottom surface 35 which is pierced by spaced parallel cylindrical bores 36, 37 which are parallel to the central axis of the prism and at diametrically opposed offsets from the central axis. Bore 36 will be understood to provide support for the lower end of the light-transmitting optical fiber 23, and in similar fashion, bore 37 supports the lower end of the optical fiber 24 which is exposed to light that is internally reflected within the prism 15. Specifically, downwardly directed light which exits from fiber 23 is conducted for incidence with a first locale 38 which is part of a downwardly convergent geometrical cone having a 90 degree apex angle. If the environment of prism 15 is air, then this light will be internally reflected from locale 38 in the diametrical direction 40 (FIG. 8) to a second such locale 39, for further reflection upward into the optical fiber 24 which is monitored by photodiode 25; locale 41 will be understood to be part of the same geometrical cone (specifically, cone frustum) as is locale 38. If on the other hand, the environment of prism 15 is liquid, refraction into the environment will be substantial, and the reduced reflection detected at photodiode 25 will be clearly discerned. Prism 15 will thus be understood to enable discrimination as between liquid or air environment at upper level B, in the same manner and for the same reasons given for such discrimination by sensor 11 at the lower level A.

Figure 5:
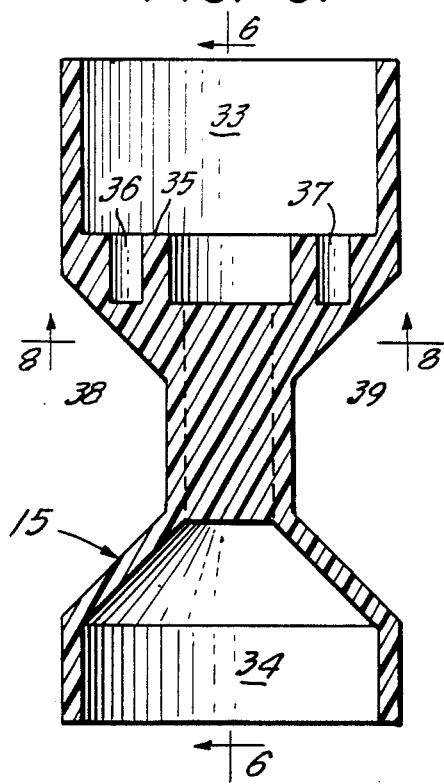
FIG. 5 is a view in longitudinal section, for an upper-level sensor component of the system of FIG. 1.
Figure 6:
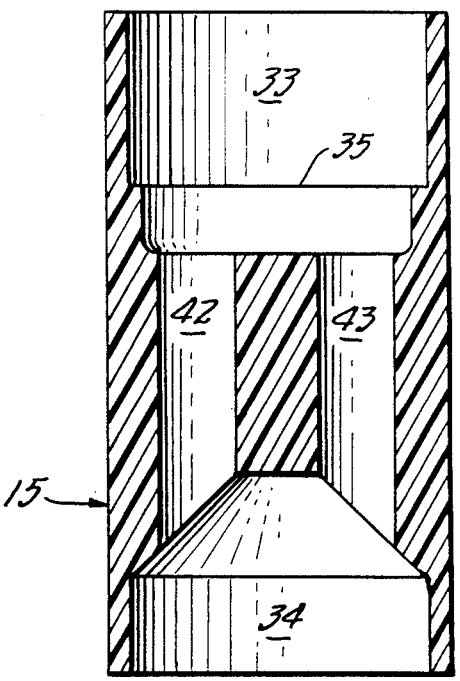
FIG. 6 is another longitudinal section, taken in the plane 6—6 of FIG. 5.

It is convenient for descriptive purposes to refer to the axes of lower ends of fibers 19 and 20 as being fixed in the same single plane of symmetry which includes the central axis of the prism 11; and the same can be said for the single plane of symmetry in which fibers 23 and 24 are retained in prism 15. However, in the case of prism 15 (and any duplicates thereof as may be assembled into a single stem array which includes response at more than one upper level), provision must be made for internal containment of pairs of optical fibers serving each level lower than upper level B. To this end, FIGS. 5 to 8 show that the prism 15 is formed with one or more through-bores 42, 43 which are parallel to each other and to the central axis, in diametrically opposed relation, pursuant to a second plane of symmetry which includes the central axis and which is normal to the plane of symmetry for retaining the lower ends of the involved optical fibers. The section of FIG. 5 is taken in the first of these planes of symmetry, and the section of FIG. 6 is taken in the second of these planes of symmetry. And it will be understood that the diameter of bores 42, 43 is sufficient to accommodate a substantial plurality of optical-fiber pairs which must by-pass any upper-level sensor in order to serve a sensor of lower liquid level.

Figure 8:
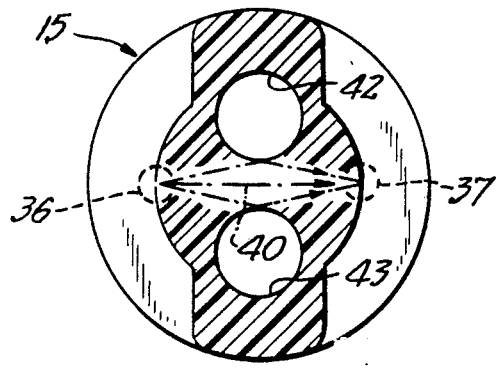
FIG. 8 is a horizontal section, taken at the plane 8—8 of FIG. 5.

FIG. 8 is taken at the horizontal section which accommodates the central diametrical alignment of internal reflection, from locale 38 to locale 39. Not all rays of this internal reflection will be on a straight diametral path, because an angular spread of perhaps 60 degrees may characterize internal reflection from locale 38. This spread may be somewhat Gaussian in its distribution, either side of the alignment 40. But FIG. 8 shows that by having provided the through-bores 42, 43 with their described symmetrical offsets from the central axis of the prism, these bores 42, 43 provide plastic-to-air interfaces which serve to reflect and thus to redirect divergent internally reflected rays back toward the second locale 39, for more efficient photodetector response to internal reflection. As shown in FIG. 8, the spread of internally reflected light from locale 38 is limited to about 30 degrees, but these 30 degrees are at the central region of the Gaussian distribution and therefore account for the preponderance of internally reflected light.

What is claimed is:

1. A multi-level fiber-optic liquid-level sensing system, comprising upper and lower elongate tubular suspension members, an upper-level sensor connected to the lower end of said upper member and to the upper end of the said lower member, a lower-level sensor connected to the lower end of said lower member, and means for suspending the connected members and sensors from the upper end of said upper member, said sensors each being a solid cylindrical body of light-transmitting material with an exterior profile which includes a downwardly convergent surface portion at least at spaced locales which are at equal but opposite offset from the cylindrical body axis, the geometric apex angle of downward convergence being 90 degrees; a first pair of optical fibers contained within the upper tubular member and externally accessible at their upper ends, the respective lower ends of said optical fibers being embedded in the body of said upper sensor on diametrically opposed axes parallel to the cylindrical body axis of the upper sensor, the geometric downward projection of each of said lower ends having incidence with a different one of the spaced locales of said upper sensor, and the body of said upper sensor having at least one through-bore at radial offset from a direct diametrically extending path between the spaced locales of said upper sensor; a second pair of optical fibers contained within the upper tubular member and said lower tubular member, with at least one of the optical fibers of said second pair contained within said through-bore, the optical fibers of said second pair being externally accessible at their upper ends, the respective lower ends of the optical fibers of said second pair being embedded in the body of said lower sensor on diametrically opposed axes parallel to the cylindrical body axis of the lower sensor, and the geometric downward projection of each of the lower ends of the second pair of optical fibers having incidence with a different one of the spaced locales of said lower sensor.

2. The sensing system of claim 1, in which each sensor body is of a light-transmitting plastic material.

3. The sensing system of claim 1, in which for the upper end of each pair of optical fibers a light-emitting diode is connected to one fiber end and a photodiode is connected to the other fiber end.

4. The sensing system of claim 1, in which the through-bore is one of two, with diametrically opposed symmetry about the cylindrical body axis, said through-bores being so spaced from each other as to additionally provide further reflecting surfaces for enhanced convergence of light passage from one to the other of said locales.

5. A liquid-level sensor body for use in a multi-level fiber-optic liquid level sensing system, said body being generally cylindrical and of light-transmitting material and adapted for suspension with its central axis in vertical orientation, there being intermediate upper and lower ends of said body an exterior profile reduction which is downwardly convergent at least at spaced locales which are at equal but opposite offset from the cylindrical body axis, the geometric apex angle of downward convergence being 90 degrees, the upper end of said body having a first pair of upwardly open like bores for optical-fiber reception on diametrically opposed axes that are parallel to the cylindrical body axis, the geometric downward projection of each of said bores having incidence with a different one of said spaced locales, said body having at least one through-bore at radial offset from a direct diametrically extending path between said spaced locales, and said body having a connection formation concentric with the cylindrical body axis at each of the upper and lower ends of said body.

6. A liquid-level sensor according to claim 5, in which the through-bore is at such offset from said cylindrical body axis as to additionally provide a further reflecting surface for enhanced convergence to one of said locales of a divergent fraction of light reflected at the other of said locales.

7. A liquid-level sensor according to claim 5, in which the lower end of said body has a downwardly open cylindrical bore concentric with the cylindrical body axis for telescoping fit to a tubular suspension member beneath said body, said downwardly open cylindrical bore having a bottom surface which is intersected by the open end of said through-bore.

8. A liquid-level sensor body according to claim 5, in which said convergent profile reduction is the frustum of a cone.

9. A liquid-level sensor body according to claim 5, in which the through-bore is one of two, with diametrically opposed symmetry about the cylindrical body axis, said through-bores being spaced from each other to permit a direct passage of light from one to the other of said locales and between said through-bores.

10. A multi-level in-line fiber-optic liquid-level sensing system, comprising an interconnected array of generally cylindrical upper and lower sensor elements with interposed tubular connecting members, all on a single axis and adapted for vertical suspension, each of said sensors being a solid cylindrical body of light-transmitting material with an exterior profile which includes a downwardly convergent surface portion at least at spaced locales which are at equal but opposite offset from said single axis, the geometric apex angle of downward convergence being 90 degrees; a first pair of optical fibers extending through the upper portion of said array with lower ends of its respective fibers (a) embedded in the body of an upper sensor on diametrically opposed axes parallel to said single axis, and (b) downwardly directed for incidence with a different one of the spaced locales of said upper sensor; and a second pair of optical fibers extending through said array with lower ends of its respective fibers (c) embedded in the body of the lower sensor on diametrically opposed axes parallel to said single axis and (d) downwardly directed for incidence with a different one of the spaced locales of said lower sensor.

* * * * *